United States Patent [19]

Takano

[11] Patent Number: 4,917,509

[45] Date of Patent: Apr. 17, 1990

[54] FLANGED BEARING AND PROCESS FOR PRODUCING SAME

[75] Inventor: Hiroshi Takano, Saitama, Japan

[73] Assignee: Senju Metal Industry Co., Ltd., Tokyo, Japan

[21] Appl. No.: 314,174

[22] Filed: Feb. 22, 1989

[30] Foreign Application Priority Data

Mar. 4, 1988 [JP] Japan ............................ 63-28119[U]

[51] Int. Cl.⁴ ............................................. F16C 33/04
[52] U.S. Cl. .................................... 384/275; 384/296
[58] Field of Search ............... 384/275, 296, 295, 294, 384/276, 291

[56] References Cited

U.S. PATENT DOCUMENTS

Re. 16,210  11/1925  Williams ............................... 384/296
3,801,209   4/1974   Matsuoka ............................. 384/296
4,806,024   2/1989   Tanaka et al. ....................... 384/296

Primary Examiner—Lenard A. Footland
Attorney, Agent, or Firm—Tarolli, Sundheim & Covell

[57] ABSTRACT

Disclosed is a flanged bearing for supporting a shaft and adapted to be fitted in an opening formed in a housing, the bearing being produced by applying sintered copper alloy powder to one side of a length of a steel plate, rolling the steel plate into a cylinder with the copper alloy layer disposed on the inside of the cylinder, cutting an annular clearance means around the inner periphery of the cylinder, forging the cylinder at the end thereof adjacent to the clearance means, and machining the periphery of the flange to finish the flange as a precise circle.

2 Claims, 7 Drawing Sheets

FLANGED BEARING AND PROCESS FOR PRODUCING SAME

BACKGROUND OF THE INVENTION

This invention relates to a flanged bearing adapted to support a shaft and to be fitted in an opening in a housing, and to a process for making the same.

Prior art flanged bearings have been known which comprise a cylindrical body and a flange that extends radially outwardly at one end of the cylindrical body, the cylindrical body being designed to support loads applied transversely and the flange to support loads applied axially.

In the flanged bearings that are conventionally employed in the wheels provided on the undersurfaces of machines used in civil engineering such as bulldozers and power shovels, the frictionally slidable portions of the bearings are subjected to high loads and, thus, these frictionally slidable portions are formed of steels having high mechanical strength with load-resistant alloys such as LBC and/or PBC applied thereto. Thus, the portions of the bearings that fit tightly in an opening in a housing exhibit very high strength.

FIGS. 9 and 10 show a prior art flanged bearing adapted to support a shaft and to be fitted in an opening in a housing. The prior art flanged bearing is generally shown by reference numeral 20 and comprises a cylindrical body 21 and a radially outwardly extending flange 22 at one end of the cylindrical body 21. Small chamfers 24, 24 are provided at the opposite ends of the inner periphery of the cylindrical body 21; and wherein the length of the clearance means is greater or equal to the thickness of the flange plus the depth of the housing chamfer. The provision of the chamfers 24, 24 facilitates the receiving of a shaft 15 in the bearing and protects the acutely angled ends of the cylindrical body against the possibility of breakage when the shaft vibrates or bends during rotation.

However, after continuous use of the flanged bearing over a long period of time, a crack or cracks K tend to develop in the cylindrical body 21 at the end thereof adjacent to the flange 22, as shown in FIG. 10.

After extensive studies of the cause of such cracking in the prior art flanged bearing. The inventor has found that the chamfers formed at the opening in the housing have an influence. These chamfers at the housing opening allow the flanged bearing to fit smoothly in the housing. That is, the clearance between the outer periphery of the housing body and the outer diameter of the cylindrical body of the flanged bearing is usually small, on the order of 0.05-0.2 mm, and if the entrance to the housing opening remains rough as initially formed, this entrance presents an acutely angled edge and the outer periphery of the cylindrical body of the flanged bearing is thus caught by the acute edge of the housing opening to such an extent that the flanged bearing cannot be fitted into the housing opening. For this reason, the entrance to the housing opening is formed with a chamfer to allow the flanged bearing to fit into the housing opening easily.

Furthermore, when an excessively high load is applied to the shaft 15 received in the bearing and/or the bearing and shaft are eccentric to each other, the shaft 15 tends to bend as shown in FIG. 10 while rotating. At this time, a substantial portion of the load is applied to a portion of the cylindrical body, that is, the end of the cylindrical body adjacent to the flange 22, but since the chamfer 24 is formed adjacent to the entrance of the opening 17 in the housing 18 where the non-flanged end of the cylindrical body is positioned, a cavity is left into which the non-flanged end of the cylindrical portion or body bends. Thus, as the shaft bends cylindrically, the end tends to bend into and out of the cavity and metallic fatigue therefore occurs at that end which may lead to development of cracking of the material of the cylindrical body.

SUMMARY OF THE INVENTION

Thus, the present invention aims to provide a novel and improved flanged bearing asapted to receive a shaft and to be fitted in an opening in a housing and comprising a cylindrical body and a flange extending radially outwardly at one end of the cylindrical body, the cylindrical body being provided with a chamfer positioned in alignment with a chamfer provided at the opening in the housing or inwardly spaced from the housing chamfer.

The above and other objects and attendant advantages of the present invention will be more readily apparent to those skilled in the art from a reading of the following detailed desription in conjunction with the accompanying drawings which show preferred embodiments of the invention for illustration purpose only, and not for the purpose of limiting the scope of the same in any way.

PREFERRED EMBODIMENTS OF THE INVENTION

The present invention will now be described with reference to the drawings and, more particularly, to FIGS. 1 to 4 in which an embodiment of the flanged bearing of the invention is illustrated.

Figure 1:
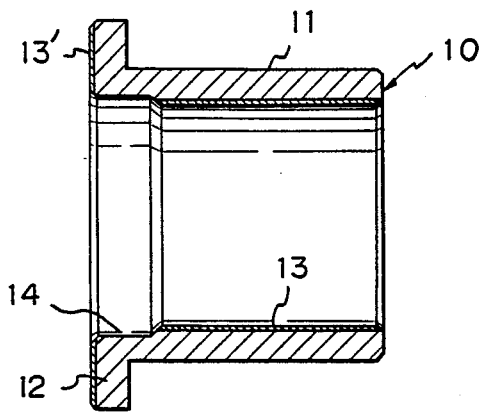
FIG. 1 is a longitudinally sectional view of one preferred embodiment of the flanged bearing constructed in accordance with the principle of the present invention taken along the longitudinal center line of the bearing.
Figure 2:
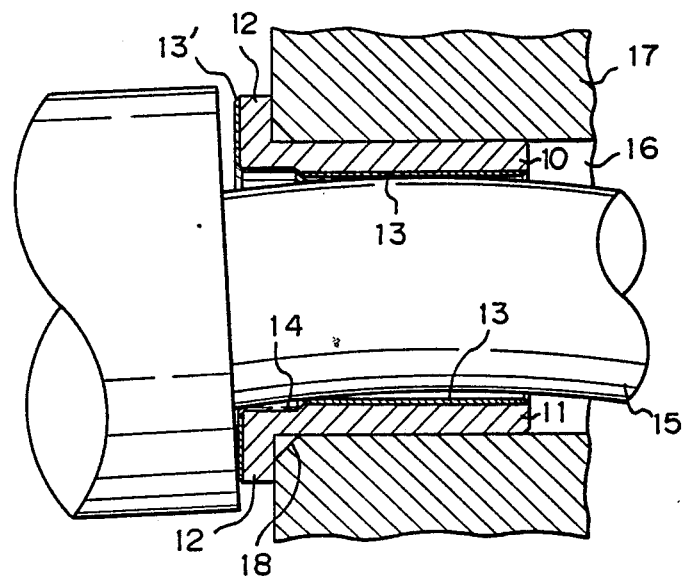
FIG. 2 is an enlarged view of the flanged bearing shown in FIG. 1 showing the bearing fitted in an opening in a housing and supporting a shaft.
Figure 3:
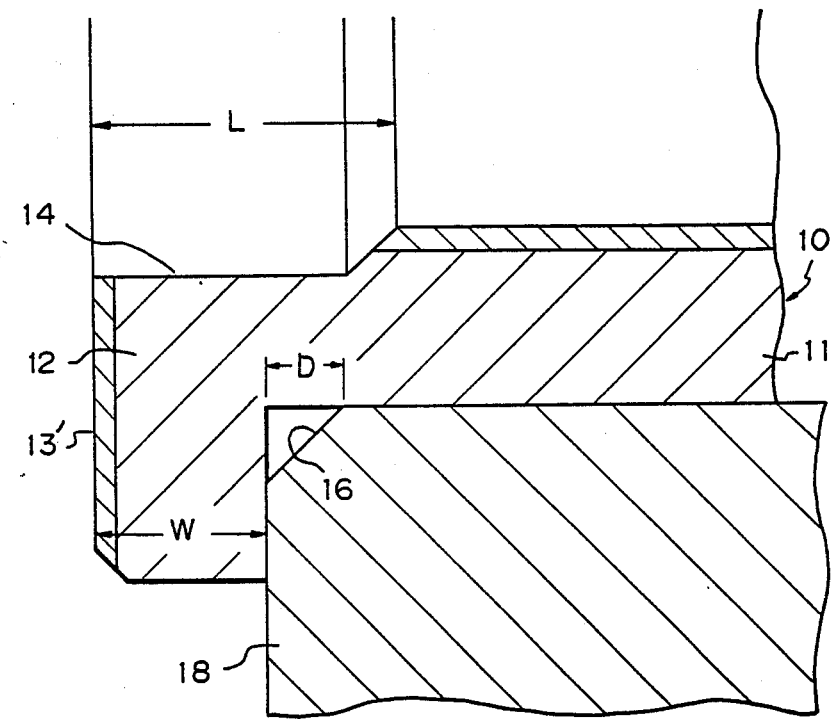
FIG. 3 is a fragmentary longitudinally sectional view on a further enlarged scale of the bearing, housing and shaft assembly shown in FIG. 2 showing the dimensional relationship between the length of the clearance means, the depth of the chamfer and the thickness of the flange.

A preferred embodiment of the flanged bearing of the invention is generally shown by reference numeral 10 and comprises a cylindrical body 11 and a radially outwardly extending annular flange 12 formed integrally with one end of the cylindrical body (the left-hand end as seen in FIG. 1). The body 11 and flange 12 are formed of steel, for example. An annular lining 13 formed of sintered copper alloy powder is applied to the inner peripheral surface of the cylindrical body 11 and an annular protective plate 13' is applied to the outer surface of the flange 12. The inner peripheral surfaces of the cylindrical body 11 and lining 13 are chamfered at the ends adjacent to the flange 12 to form clearance means 14 so that a shaft 15 supported in the flanged bearing 10 is prevented from contacting the flange 12 on the bearing body 11 even when the shaft 15 bends while rotating. The flanged bearing 10 is received in an opening 16 in a housing 17 and the opening 16 is formed with a chamber 18 which is positioned adjacent to the flange 12 when the bearing is received in the housing 17. The clearance means 14 may align with or be positioned inwardly from the chamfer 18 on the housing opening 16. In the illustrated embodiment, the clearance means comprises a groove.

Figure 8:
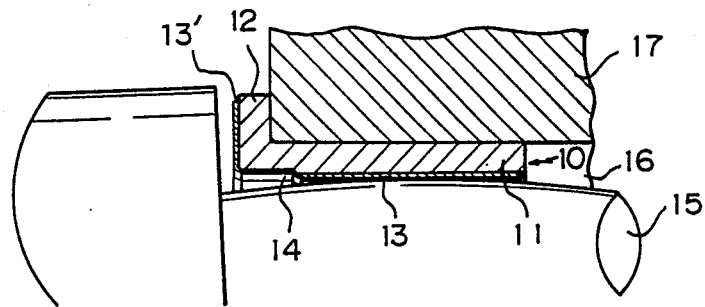
FIG. 8 is a longitudinally sectional view of another embodiment of the flanged bearing according to the present invention showing the bearing fitted in an opening in a housing and supporting a shaft.
Figure 9:
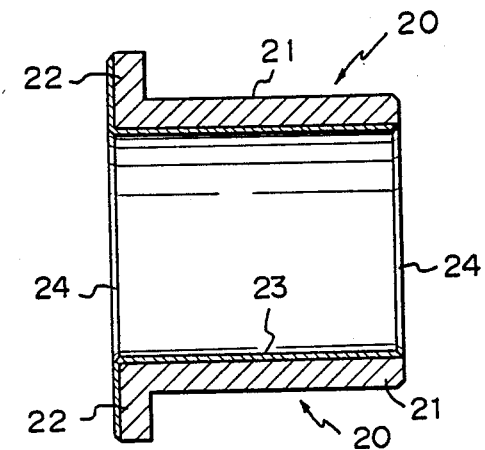
FIG. 9 is a longitudinally sectional view of a prior art flanged bearing taken along the longitudinally center line of the bearing.
Figure 10:
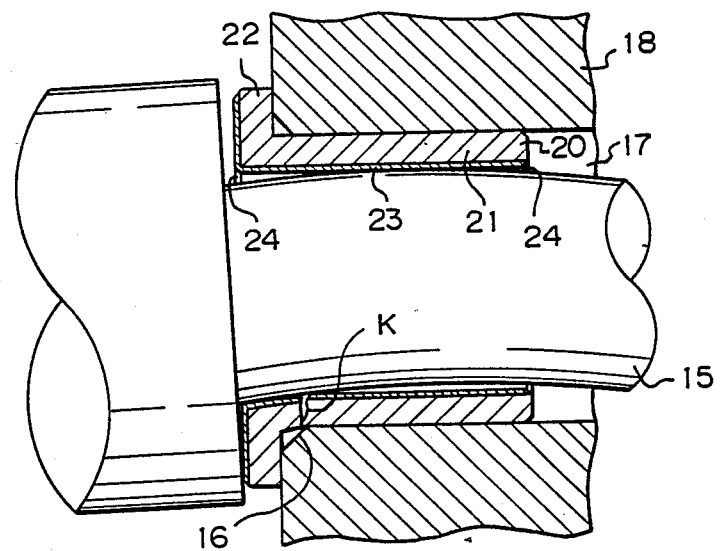
FIG. 10 is a longitudinally sectional view of a prior art flanged bearing fitted in an opening in a housing and suppporting a shaft, showing the development of cracking in the flanged bearing.

FIG. 8 shows another preferred embodiment of the flanged bearing of the present invention which is substantially similar to the first preferred embodiment except that the clearance means 14 is preformed by the use of a steel plate which is reduced in thickness at one end portion thereof adjacent to the end where the flange 12 is to be formed, the flange and end portion not being lined.

The relationship between the clearance means 14, flange 12 and chamfer 18 in the present invention is given by the following formula:

The length L of the clearance means 14 ≧ the thickness W of the flange 12 + the depth D of the chamfer 18

In the present invention, the shape of the clearance means 14 is not limited to the illustrated step shape; it may alternatively be an inclined groove (not illustrated here).

Next, the manner in which the shaft 15 is supported in the flanged bearing of the present invention will now be described.

Even when the shaft 15 received in the flange bearing 10 bends towards the flange 12 on the cylindrical body 11 of the bearing 10, since the clearance means 14 is present adjacent to the flanged end of the bearing body, there is no possibility of the shaft contacting the flanged end of the cylndrical body 11.

Thus, the shaft 15 would not act to push the end of the cylindrical body adjacent to the flange, which might cause the material of the cylindrical body to bend into the cavity defined by the chamfer 18 on the housing. This prevents the development of any cracking. The area of the cylindrical body which is subjected to a high degree of force by the shaft is that positioned short of the clearance means 14, that is, the area of the housing 17 which is positioned inwardly from the chamfer 18.

One example of a process for producing the flanged bearing of the present invention will now be described by referring to FIG. 4 in which the steps for producing a flanged bearing according to the present invention are illustrated.

Figure 4:
FIGS. 4A-4E show the steps of a process for producing the flanged bearing of the invention.
Figure 4:
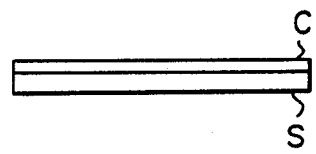
Figure 4:
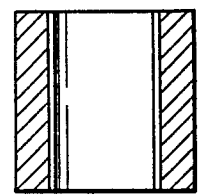
Figure 4:
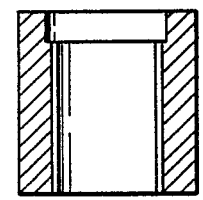
Figure 4:
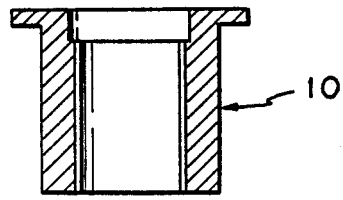

In a first step, a length of steel plate is provided (FIG. 4-A).

In a second step, sintered copper alloy powder is applied to one side of the steel plate to form a copper alloy layer thereon (FIG. 4-B).

In a third step, the steel plate having the copper alloy layer applied thereto is rolled into a cylinder with the copper alloy layer disposed on the inner side of the cylinder (FIG. 4-C).

In a fourth step, an annular clearance groove or means is formed around the inner periphery of the cylinder (FIG. 4-D).

In a fifth step, the cylinder is forged at the end which is adjacent to the clearance means to displace the material of the cylinder radially outwardly and thus to provide a flange there (FIG. 4-E).

In a sixth step, the periphery of the flange is machined to finish the flange to a precise circle.

Figure 5A:
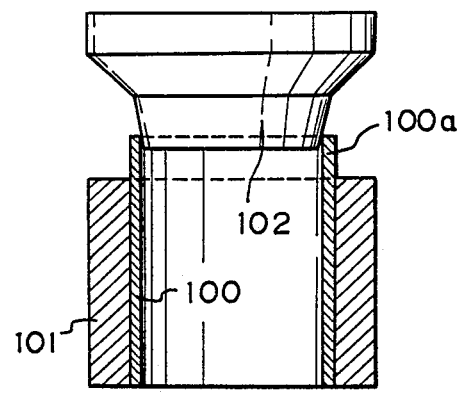
FIGS. 5a and 5b show different steps for forging one end of a cylindrical body to form a flange at one end of the body.
Figure 5B:
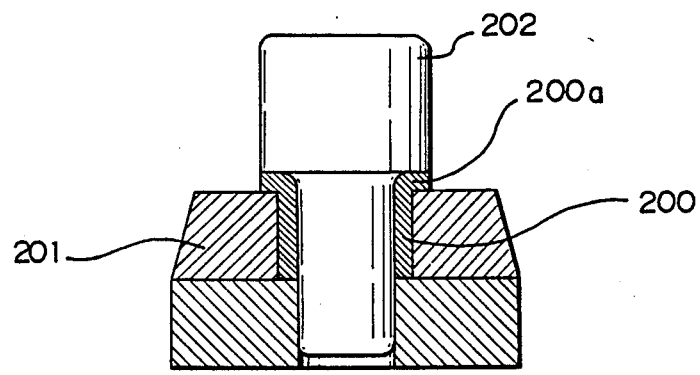
Figure 6A:
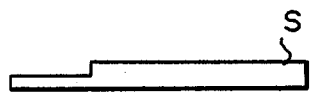
FIG. 6 is a side view of the steel plate one end portion of which is reduced in thickness and one side of which has sintered copper alloy powder applied thereto.
Figure 6B:
Figure 7A:
FIG. 7 is a side view of the steel plate one side of which has sintered copper alloy powder applied thereto, omitting one end portion thereof.
Figure 7B:
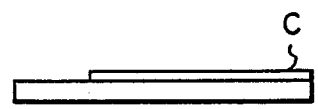

The above-mentioned fifth step may also be performed by radially outwardly forging the end of the cylinder body 100 adjacent to the clearance means in a cylindrical die 101 with the end 100a projecting above the die 101, using a frusto-conical die 102, as shown in FIG. 5a, or by radially outwardly forging the end of the cylindrical body 200 adjacent to the clearance means in a vertically split cylindrical die 201 with the end 200a projecting above the die by the use of a punch 202 as shown in FIG. 5b.

According to the present invention, it is also contemplated that a length of steel plate with one end portion that is reduced in thickness could be provided as the starting material to allow the clearance means for the bearing to be preformed so as to eliminate the above-mentioned fourth step, and also that a length of steel plate having a uniform thickness could be provided as the starting material and that sintered copper alloy powder could be applied to the plate throughout its length except for one end portion thereof, thereby preforming the clearance means and eliminating the above-mentioned fourth step.

In another embodiment of the process of the present invention, a length of steel plate is employed which is reduced in thickness at one end portion thereof so as to preform the clearance means and thereby eliminate the fourth step described hereinabove. In the second step of a further modified embodiment of the process of the present invention, sintered copper alloy is appled on one side of a length of steel plate throughout its length except for an area adjacent to one end thereof so as to form clearance means in that area, thereby eliminating the fourth step described hereinabove.

As described hereinabove, according to the present invention, the end of the cylindrical body adjacent to the flange will not flex even when the shaft bends while rotating and, thus, no crack develops in the bearing due to metallic fatigue. Consequently the bearing exhibits stable bearing characteristics for a long period of time.

While preferred embodiments of the invention have been described and illustrated in detail, it will be understood that the same have been explained for the purposes of illustration only, and are not to be taken as a definition of the invention, reference being required for that purpose to the appended claims.

What is claimed is:

1. A flanged bearing provided with a chamfer and adapted to be fitted in an opening formed in a housing and to receive a shaft, said bearing comprising a cylindrical body and a radially outwardly extending flange formed integrally with one end of said cylindrical body, the inner periphery of said cylindrical body being formed with a clearance means adjacent to said flanged end.

2. A flanged bearing as set forth in claim 1 in which an annular lining is applied to the inner periphery of said cylindrical body and an annular protective plate is attached to the outer surface of the flange.

* * * * *